United States Patent [19] | [11] 4,107,754
Ishida et al. | [45] Aug. 15, 1978

[54] DISCHARGE GAP DEVICE

[75] Inventors: Yotsuo Ishida, Chofu; Hiroshi Kuwahara, Amagasaki, both of Japan

[73] Assignees: Mitsubishi Denki Kabushiki Kaisha; The Tokyo Electric Power Co., Inc., Japan

[21] Appl. No.: 591,396

[22] Filed: Jun. 30, 1975

[30] Foreign Application Priority Data

Jul. 10, 1974 [JP] Japan ................................ 49-79373

[51] Int. Cl.[2] ................................ H02H 9/00
[52] U.S. Cl. ................................ 361/120
[58] Field of Search .................. 317/62; 313/208, 307, 313/308; 361/120

[56] References Cited

U.S. PATENT DOCUMENTS

| | | | |
|---|---|---|---|
| 1,110,557 | 9/1914 | Hewitt | 313/208 X |
| 1,873,957 | 8/1932 | Egli | 313/307 X |
| 3,454,823 | 7/1969 | Marx et al. | 313/307 X |

*Primary Examiner*—Harry E. Moose, Jr.
*Attorney, Agent, or Firm*—Robert E. Burns; Emmanuel J. Lobato; Bruce L. Adams

[57] ABSTRACT

Two trigger electrodes are insulatingly extended through one of two main opposite electrodes and connected to both ends of a secondary winding of a current transformer. The secondary winding has a central tap connected to that main electrode through which the trigger electrodes extend. A voltage is applied across the main electrodes and a trigger pulse is supplied to the trigger electrodes through the current transformer to initiate an electric discharge across the main electrodes.

2 Claims, 7 Drawing Figures

DISCHARGE GAP DEVICE

BACKGROUND OF THE INVENTION

This invention relates to improvements in an electric discharge gap device used, for example, in a protective device for protecting a series capacitor against an overvoltage thereacross.

In conventional electric discharge gaps with the trigger electrodes it is well known that, when a potential at the trigger electrode is opposite in polarity to that at the main electrode opposing to the trigger electrode, an electric discharge is caused across the main opposite electrodes with a small delay time. Otherwise the electric discharge occurs with a relative large delay time that is differently variable. Thus upon protecting series capacitors connected in electric power systems of alternating current against overvoltages, the use of such conventional electric discharge gaps has been fatally disadvantages in that in each half cycle of the system voltage in which the trigger electrode thereof is applied with a potential having the same polarity as that at the main electrode opposing to the trigger electrode, the particular system fault may cause the dielectric breakdown of the series capacitor due to an abnormal increase in voltage thereacross within a time interval between the occurrence of that fault and the initiation of an electric discharge across the main electrode of the associated discharge gap. In order to avoid that fatal disadvantage, one could use a pair of conventional electric discharge gaps with the trigger electrode connected in parallel relationship across a series capacitor. However this measure is disadvantageous in that the resulting protective device becomes large-sized and objectionable in view of the maintenance and economy involved.

SUMMARY OF THE INVENTION

Accordingly it is an object of the present invention to provide a new and improved electric discharge gap device fast in response and stable in electric discharge characteristics.

The present invention accomplishes this object by the provision of an electric discharge gap device comprising a pair of main electrodes disposed in spaced opposite relationship, a plurality of trigger electrodes disposed in one of the main electrodes, a current transformer having a secondary winding connected to the plurality of trigger electrodes, and means for simultaneously applying electric potentials to the plurality of trigger electrodes so that at least one of the trigger electrodes has applied thereto an electric potential opposite in polarity to the electric potentials applied to the remaining trigger electrodes.

In a preferred embodiment of the present invention, a pair of trigger electrodes may be disposed in one of the main electrodes and the secondary winding of the current transformer may include an intermediate tap connected to that main electrode having the pair of trigger electrodes disposed therein and both ends connected to the pair of trigger electrodes respectively.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Figure 1:
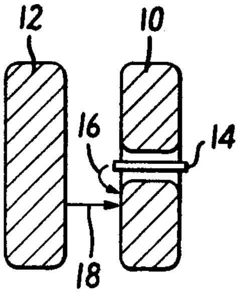
FIG. 1 is a sectional view of an electric discharge gap with a trigger electrode useful in explaining the discharge mode I.
Figure 2:
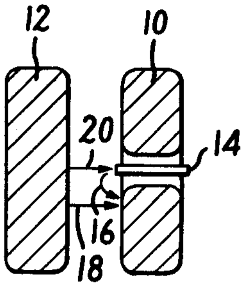
FIG. 2 is a view similar to FIG. 1 but illustrating the discharge mode II.

It is well known that electric discharges can occur across electric discharge gaps with the trigger electrode in either one of a pair of discharge modes of either the discharge mode I as shown in FIG. 1 or the discharge mode II as shown in FIG. 2. In each of FIGS. 1 and 2 a pair of main electrodes 10 and 12 are shown as being disposed in spaced opposite relationship with each other. One of the main electrodes 10 has extended therethrough a hole through which a trigger electrode 14 centrally passes in electrically insulating relationship and has both ends slightly projecting beyond the opposite surfaces thereof.

In the discharge mode I as shown in FIG. 1, a spark discharge 16 is first caused across the main and trigger electrodes 10 and 14 respectively to produce a plasma. This plasma affects the electrical insulation between the main electrodes until a principal electric discharge 18 is developed across the main electrodes 10 and 12 respectively. Assuming that the main electrode 10 is put at a reference potential, the discharge mode just described is prone to occur when a potential at the main electrode 12 is identical in polarity to that at the trigger electrode 14.

On the other hand, with a potential at the main electrode 12 opposite in polarity to that at the trigger electrode 14, the discharge mode II as shown in FIG. 2 is prone to be developed. More specifically, an electric discharge 20 is first caused across the main and trigger electrodes 12 and 14 respectively and then both electrodes become equal in potential to each other leading to the occurrence of an electric discharge 16 across the main and trigger electrodes 10 and 14 respectively. This discharge 16 grows into a principal electric discharge 18 across the main electrodes 10 and 12.

Figure 3:
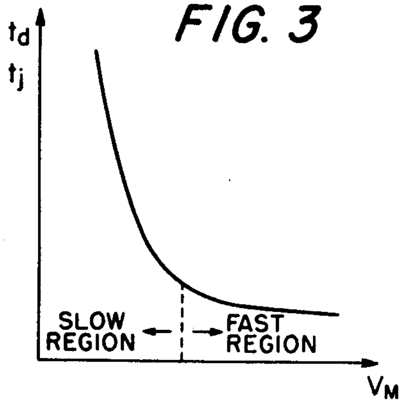
FIG. 3 is a graph illustrating the trigger characteristic of discharge gaps.

FIG. 3 shows the trigger characteristic describing a discharge delay time $t_d$ and a discharge fluctuating time $t_j$ plotted in ordinate against a voltage $V_M$ across the main electrodes in abscissa. The term "discharge delay time" is defined by a delay time with which the electric discharge gap is electrically discharged after the particular trigger voltage has been applied to the trigger electrode thereof. In FIG. 3 it is seen that the $V_M$ has a certain value at which the slope of the curve is initiated to rapidly sharpen and which forms the boundary between two regions. One of the regions located to the right of that value of the $V_M$ is called a fast region and corresponds to the discharge mode II as above described while the other region located to the left of the such a value of the $V_M$ is called a slow region and corresponds to the discharge mode I.

As seen in FIG. 3, the $t_d$ and $t_j$ remain substantially unchanged with a variation in the $V_M$ and are small within the fast region. This means that the trigger characteristic is fast in response and stable within the fast region. On the other hand, the $t_d$ and $t_j$ becomes very large within the slow region. This means that the trigger characteristic is unstable within the slow region.

In order to cause an electric discharge within the fast region, one should satisfy the following relationships:

$$V_M + V_t > V_B \quad (1)$$

and $$V_S > V_t \quad (2)$$

where $V_B$ designates a dielectric breakdown voltage across the main electrodes 10 and 12, $V_t$ a trigger voltage and $V_S$ designates a dielectric breakdown voltage across the trigger and main electrodes 14 and 10 respectively. In other words, it is required to increase the dielectric breakdown voltage $V_S$ across the trigger and main electrodes 14 and 10 respectively and to increase a voltage across the main and trigger electrodes 12 and 14 by adding the trigger voltage $V_t$ to the voltage $V_M$ across the main electrodes. To this end, the potential at the main electrode 12 should be opposite in polarity to that at the trigger electrode 14 with the main electrode 10 maintained at a reference potential.

The foregoing has be reported in the National Meeting of the Institute of Electrical Engineering of Japan held in 1973, by Shihei Takeda article entitled "High Current Gap Switch," (Symposium 2-1).

Accordingly, in order to provide electric discharge gaps with the trigger electrode fast in response and stable in discharge characteristic, it is required to apply to the trigger electrode a voltage opposite in polarity to that across the main electrodes thereby to bring about an electric discharge in the fast region.

If a voltage applied across the main electrodes has a predetermined fixed polarity as the direct current voltage, then an electric discharge can be simply caused in the fast region because the voltage applied to the trigger electrode may have the polarity maintained either positive or negative.

On the other hand, if the voltage applied across the main electrodes has the polarity always inverted from one to the other of the senses as the alternating current voltage, then an electric discharge can be caused in the fast region with either one of the polarities of the voltage across the main electrodes. However, with the voltage across the main electrodes having the opposite polarity, the resulting electric discharge will appear in the slow region. Thus the discharge delay time $t_d$ and discharge fluctuating time $t_j$ may be varied dependent upon the particular polarity of the voltage across the main electrodes. Thus there can not be provided electric discharge gaps with the trigger electrode stable in discharge characteristic.

If it is attempted to provide the discharge characteristic in the fast region with either of the polarities of an alternating current voltage applied across the main electrodes then a method could be devised using a pair of discharge gaps with respective trigger electrodes interconnected in parallel circuit relationship, and trigger voltages of different polarities applied to the respective trigger electrodes thereby to electrically discharge either one of the discharge gaps in the fast region. Due to the necessity of using a pair of discharge gaps with individual trigger electrodes, this method has been very disadvantageous in that the resulting device becomes large-scaled and objectionable in view of the maintenance and economy involved.

Recently the demand for electric power is increased and power plants are installed at remote places. Following this the series capacitor system is being adapted as means for the stable transmission of high electric powers through long distances. However upon the occurrence of a fault in such an electric power system a fault current, for example, a shortcircuit current flows through series capacitors connected in the system so that voltages thereacross are abnormally increased and the series capacitors area exposed to a danger that they will be dielectrically broken down.

In order to protect the series capacitor against an overvoltage thereacross, protective systems have been already proposed including an electric discharge gap with a trigger electrode connected across the capacitor and adapted to be discharged upon the generation of an overvoltage across the capacitor thereby to shortcircuit the latter. Since a voltage across the capacitor is proportional to both a magnitude of a current flowing through the capacitor and a duration of the current, it is ideally desirable to provide a minimum possible discharge delay time $t_d$. However, where conventional discharge gaps with the trigger electrode are electrically discharged in the slow region, the discharge delay time $t_d$ has been long and also the discharge fluctuating time $t_j$ has been also great resulting in the serious disadvantage that they can not protect the associated series capacitor against an overvoltage across the latter.

Figure 4:
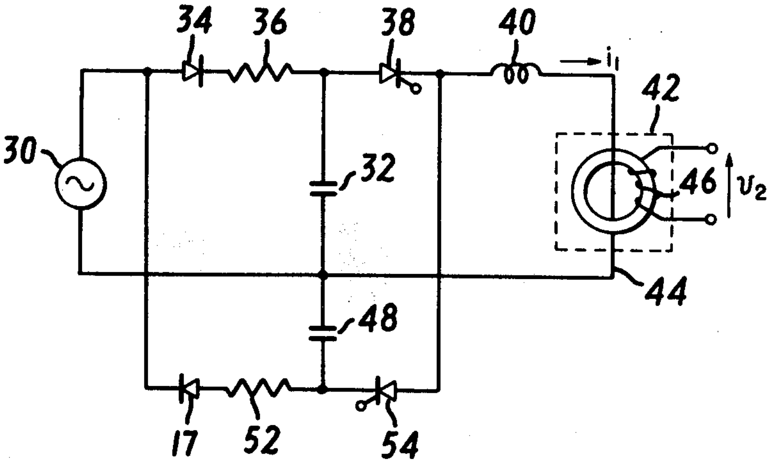
FIG. 4 PRIOR ART
FIG. 4 is a circuit diagram of a control device for electric discharge gaps constructed in accordance with the principles of the prior art.

FIG. 4 shows a conventional control device for controlling an electric discharge gap. As shown in FIG. 4, a source of alternating current 30 is connected across a capacitor 32 and through a series combination of a semiconductor diode 34 and a current limiting resistor 36 for limiting a charging current through the capacitor 32. The junction of the capacitor 32 and the resistor 36 is connected to an anode electrode of a thyristor 38 having a cathode electrode connected to a current limiting reactor 40 subsequently connected to a current transformer 42. The current transformer 42 includes a primary winding or conductor 44 connected at one end to the reactor 40 and at the other end to the source 30, and a secondary winding 46.

The source 30 is also connected across another capacitor 48 through a series combination of a semiconductor diode 17 opposite in polarity to the diode 34 and a current limiting resistor 52 for limiting a charging current through the capacitor 48. The junction of the capacitor and resistor 48 and 52 respectively is connected to the reactor 40 through another thyristor 54 opposite in polarity to the thyristor 38.

In the arrangement of FIG. 4 both capacitors 32 and 48 are charged with voltages opposite in polarity to each other from the source 30 through the respective series combinations of diode and resistor.

Figure 5:
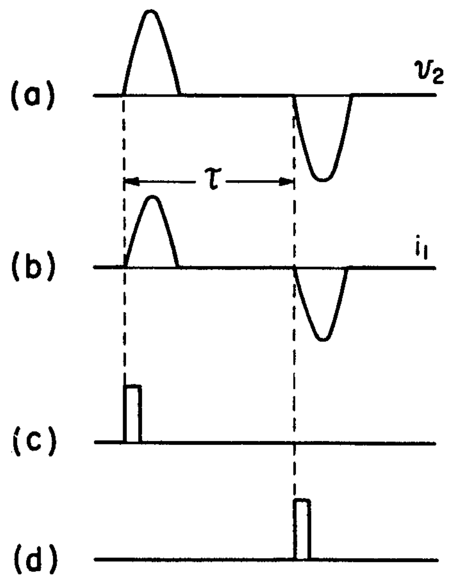
FIG. 5 is a graph useful in explaining the operation of the arrangement shown in FIG. 4.

When the gate electrode of the thyristor 38 is applied with a gate signal having a waveform *c* shown in FIG. 5, a discharging current from the capacitor 32 flows through the primary transformer conductor 44 to excite the current transformer 42. The exciting current $i_1$ is sinusoidal as shown at positive waveform *b* in FIG. 5 and determined by the total impedance of the reactor and current transformer 40 and 42 respectively. This flow of current $i_1$ through the primary conductor 44 causes a voltage $v_2$ to be induced across the secondary transformer winding 46 in a positive direction as shown at waveform *a* in FIG. 5 because the winding 46 has no load connected thereacross. The voltage $v_2$ has a magnitude as determined by the exciting current $i_1$.

After a time interval of $\tau$ seconds starting with the application of the gate or trigger signal to the gate electrode of the thyristor 38, a gate signal having a waveform *d* shown in FIG. 5 is applied to the gate electrode of the thyristor 54 to permit the capacitor 48 to supply a discharging current to the primary conductor 44 of the current transformer 42 in a direction reversed from the direction of flow of the current $i_1$. This causes the secondary transformer winding 44 to induce thereacross a voltage $v_2$ with the negative polarity as shown at waveform *a* going negative in FIG. 5.

Thus it will be appreciated that the arrangement of FIG. 4 is effective for successively applying positive and negative voltages to the single trigger electrode of electric discharge gap by using the current transformer.

In the arrangement of FIG. 4, however, it is impossible to simultaneously induce a positive and a negative voltage across the secondary winding 46 of the current transformer 42. From FIG. 5 it will readily be seen that a time interval of $\tau$ seconds is required to elapse between the positive and negative voltages induced across the current transformer 42. This imparts the fatal disadvantage to the electric discharge gap used in protective devices for protecting the series capacitor against an overvoltage thereacross.

More specifically, the trigger voltage first applied to the discharge gap can only cause an electric discharge in the slow region as far as the trigger voltage is the same in polarity as a voltage applied to that main electrode opposing to the trigger electode of the discharge gap. Further it is desirable to render the trigger voltage as low as possible in view of the lifetime of the gate electrode. This may result in a failure in the induction of an electric discharge across the main electrodes of the discharge gap because a low trigger voltage is identical in polarity to the voltage at the opposite main electrode. Rather an electric discharge may be caused across the main electrodes of the discharge gap in response to the next trigger voltage applied to the trigger electrode with the opposite polarity and after the time interval of $\tau$ seconds. Under these circumstances, the series capacitor results in an increase in voltage thereacross during that delay time and therefore in the application of an abnormal voltage across the series capacitor.

From the foregoing it should be appreciated that any conventional discharge gap with a single trigger electrode causes no electric discharge in the fast region simultaneously with the application of a trigger voltage thereto and regardless of the polarity of the voltage applied across the main electrodes thereof.

The present invention contemplates to consistently cause an electric discharge in the fast region by a single electric discharge gap with trigger electrodes.

Figure 6:
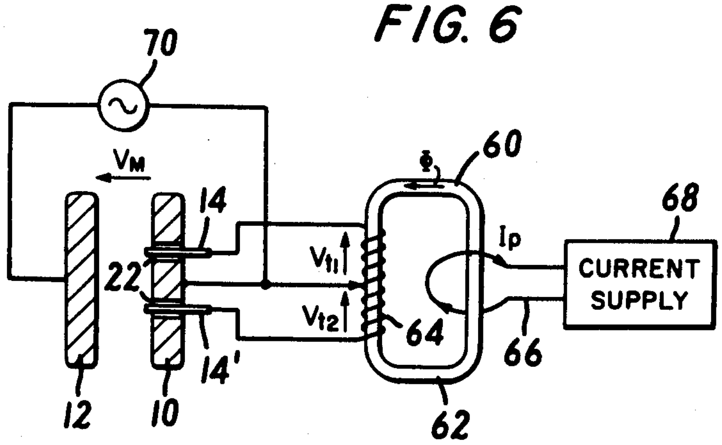
FIG. 6 is a circuit diagram of an electric discharge gap device constructed in accordance with the principles of the present invention.

FIG. 6 shows an electric discharge gap device constructed in accordance with the principles of the present invention. The arrangement illustrated comprises an electric discharge gap formed of a pair of main electrodes 10 and 12 disposed in spaced opposite relationship with the main electrode 10 including a pair of spaced trigger electrodes 14 and 14' fixedly extending therethrough and electrically insulated therefrom by means of electrical insulations 22. The arrangement further comprises a current transformer 60 including an iron core 62, a tapped secondary winding 64 inductively disposed around the iron core 62 and a primary winding 66 inductively disposed around the iron core 62. The secondary winding 64 has the beginning of its convolutions connected to the trigger electrode 14, an intermediate tap connected to the main electrode 10 and the end thereof connected to the trigger electrode 14' while the primary winding 66 connected across a current supply 68. The main electrodes 10 and 12 are shown in FIG. 6 as being conducted to both ends of a source of alternating current 70 for applying a voltage of $V_M$ thereacross.

The operation of the arrangement as shown in FIG. 6 will now be described with reference to FIG. 7. It is assumed that the voltage of $V_M$ is a voltage of alternating current whose magnitude varies with time as shown at waveform *a* in FIG. 7. Also it is assumed that at time point $t_0$O is applied across the main electrodes 10 and 12 to render the electrode 12 positive with respect to the electrode 10 and that a primary current $I_P$ from the current supply 70 flows through a primary circuit for the current transformer 60 as shown in FIG. 6. This flow of the primary current $I_P$ produces a magnetic flux $\Phi$ flowing through the iron core 62 in the direction of the arrow and expressed by $$\Phi = NI_p/R = I_p/R \quad (3)$$

where N is the number of turns of the primary winding 66 equal to one and R designates a magnetic reluctance of the iron core 62. Assuming that the secondary winding 64 has the number of turns of $N_2$ and the intermediate tap located at the center thereof to divide the winding into a pair of equal sections, voltages $V_{t1}$ and $V_{t2}$ equal to each other are induced across both sections of the secondary winding 64 interlinking the magnetic flux $\Phi$ and have an equal magnitude expressed by $$V_{t1} = V_{t2} = N_2/2\ d\Phi/dt \quad (4)$$

where *t* designates time. As shown at waveform *b* in FIG. 7, a positive voltage is generated at the trigger electrode 14 while a negative voltage is generated at the trigger electrode 14' with the main electrode 10 put at a reference potential.

It is now assumed that $V_B$ designates a dielectric breakdown voltage across the main electrodes, $V_s$ a dielectric breakdown voltage across the main electrode 10 and each of the trigger electrodes 14 or 14', $V_M$ a voltage applied across the main electrodes 10 and 12 and $V_{t1}$ and $V_{t2}$ designate trigger voltages. Under the assumed condition, the dielectric strength between the electrodes can be compromised with one another so that the relationship $$V_B > V_S > V_{t1} = V_{t2} \quad (5)$$

is met. Then at time point of $t_o$ the relationship $$V_B < V_M + V_{t2} \quad (6)$$

holds. The above relationship (6) corresponds to the relationship (1) as above described and permits that discharge gap with the trigger electrode formed of the electrodes 10, 12 and 14' to effect an electric discharge acros the main electrodes thereof within the fast region. This results in the voltage $V_M$ across the main electrodes immediately and instantaneously shortcircuiting as shown at waveform *c* in FIG. 7.

Figure 7:
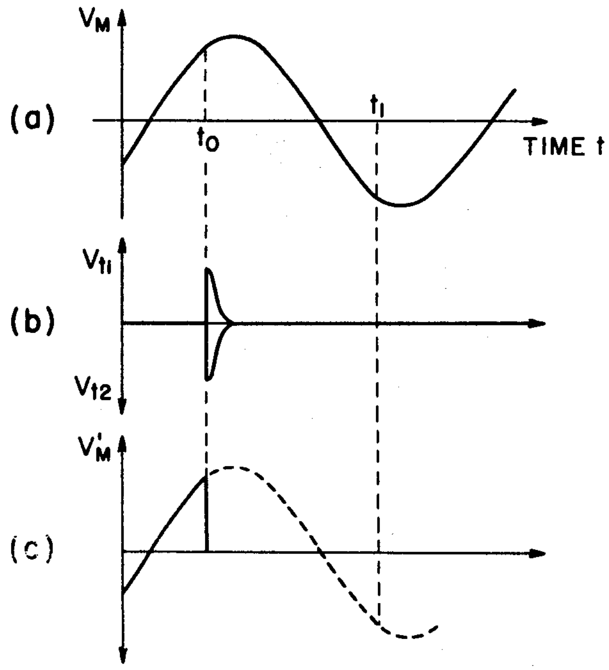
FIG. 7 is a graph useful in explaining the operation of the arrangement shown in FIG. 6.

Similarly, when a current flows through the primary transformer winding 66 from the current supply 68 at time point $t_1$ where the $V_M$ is inverted in polarity as shown at waveform *a* in FIG. 7, a voltage of $V_{t1}$ applied to the trigger electrode 14 fulfills the relationship.

$$V_B < V_M + V_{t1}$$

This means that an electric discharge in the fast region is caused across the main electrodes of that discharge gap with the trigger electrode formed of the electrodes 10, 12 and 14.

Thus it is seen that the present invention provides an electric discharge gap device capable of consistently causing stable electric discharges thereacross with a fast response. This is because a pair of trigger electrodes involved have simultaneously applied thereto respective trigger voltages equal in magnitude and opposite in polarity to each other to permit the voltage at either one of the trigger electrodes to be always opposite in polarity to that at the main electrode 12 though it would be at either a positive or a negative potential with respect to the main electrode 10.

The electric discharge as above described can be particularly easily caused in the fast region across electric discharge gaps with the dual trigger electrode such as disclosed in the present invention and disposed in the electrically insulating gas, for example, sulfur hexafluoride ($SF_6$) although such a discharge is possible to be caused in the air.

The present invention has several advantages. For example, the electric discharge gap device of the present invention is fast in response while it is stable and reliable in operation. The present invention eliminates the necessity of using, for example, means for determining the polarity of the voltage across the main electrodes, means for changing the polarity of the trigger voltage etc. because the desired electric discharge can be caused independently of the polarity of the voltage across the main electrodes. Also the present discharge gap device can be used to protect a series capacitor or the like with a high reliability in view of the adaptability and stability. Further with the present discharge gap device installed at a point of high potential for example, of 500 kilovolts for the purpose of protecting a series capacitor, the transmission of a trigger signal is accomplished through the use of a current transformer so that the electrical insulation becomes very simple and economical. In addition, the trigger control circuit is simple in maintenance because the circuit is on the side of ground potential. This results in an increase in system reliability.

While the present invention has been illustrated and described in conjunction with a single preferred embodiment thereof it is to be understood that numerous changes and modifications may be resorted to without departing from the spirit and scope of the present invention.

What is claimed is:

1. An electric discharge gap device comprising a pair of main electrodes disposed in spaced opposite relationship to define a gap therebetween, a plurality of trigger electrodes insulated from said main electrodes and extending through one of said main electrodes into said gap, and means for simultaneously applying electric potentials of opposite polarity to respective ones of said plurality of trigger electrodes for initiating in use a stable electric discharge across said gap between the other of said main electrodes and one of said trigger electrodes.

2. An electric discharge gap device as claimed in claim 1 wherein said means for simultaneously applying electric potentials comprises a current transformer including a secondary winding having an intermediate tap connected to said one of said main electrodes and ends respectively connected to respective ones of said trigger electrodes for biasing the respective trigger electrodes with potentials of opposite polarity.

* * * * *